United States Patent [19]
Becker

[11] Patent Number: 5,439,029
[45] Date of Patent: Aug. 8, 1995

[54] ROTARY LEADTHROUGH

[75] Inventor: Willi Becker, Bammental, Germany

[73] Assignee: Heidelberger Druckmaschinen AG, Heidelberg, Germany

[21] Appl. No.: 38,503

[22] Filed: Mar. 29, 1993

[30] Foreign Application Priority Data

Mar. 27, 1992 [DE] Germany .......... 42 10 009.7

[51] Int. Cl.⁶ .............................. F16L 17/10
[52] U.S. Cl. ................. 137/580; 285/101; 285/136
[58] Field of Search ............... 137/580; 285/101, 136

[56] References Cited

U.S. PATENT DOCUMENTS

| | | | |
|---|---|---|---|
| 2,390,892 | 12/1945 | McCormack | 285/101 |
| 2,568,092 | 9/1951 | Sloan et al. | 285/101 |
| 3,873,061 | 3/1975 | Thylefors | 137/580 X |
| 4,664,145 | 5/1987 | Stich et al. | 137/580 |
| 4,726,397 | 2/1988 | Stich | 137/580 |
| 4,790,699 | 12/1988 | Ringel | 137/580 X |
| 4,976,282 | 12/1990 | Kubala | 137/580 |

FOREIGN PATENT DOCUMENTS

0435164  7/1991  European Pat. Off.

Primary Examiner—John Rivell
Attorney, Agent, or Firm—Herbert L. Lerner; Laurence A. Greenberg

[57] ABSTRACT

A rotary leadthrough for feeding pressurizing medium to a rotatably mounted part includes a stator and a rotor rotatable relative thereto, the stator and the rotor being formed with at least one channel, respectively, sealing elements and sealing counter-elements respectively carried by one and the other of the stator and the rotor for cooperatively sealing the stator and the rotor therebetween and for coupling the respective channels formed in the stator and the rotor into at least one medium connection path through which pressurizing medium is feedable, the stator having a longitudinal axis, and the rotor having a rotational axis coinciding with the longitudinal axis of the stator, and a device for axially displacing the stator and the rotor relative to one another from a first position thereof wherein the sealing elements are in sealing engagement with the sealing counter-elements, to a second position thereof wherein the sealing elements and the sealing counter-elements are spaced from one another.

6 Claims, 8 Drawing Sheets

ROTARY LEADTHROUGH

SPECIFICATION

The invention relates to a rotary leadthrough for supplying a pressurizing medium such as suction or negative pressure, or a positive pressure medium to a rotatably mounted part, in particular the cylinder of a printing press.

In many areas of mechanical engineering, a demand arises for supplying a rotating part with a suction or pressure medium, for example compressed air.

A rotary transmitter for introducing compressed air into a rotating part of a printing press has become known heretofore from the published European Patent Document 0 435 164 A1, the rotary transmitter having a plurality of grooved ball bearings disposed on a rotor and supporting the rotating part. A compressed air channel is formed between respective pairs of grooved ball bearings. The grooved ball bearings are maintained in a stationary housing bushing forming a stator. An annular chamber is formed between the stator and the rotor in a region between a respective pair of adjacent grooved ball bearings, and can be charged with compressed air via a bore. Sealing washers laterally rest against the inner and outer rings of the grooved ball bearings under the pressure of the compressed air and, thereby, provide sealing. Channels or conduits leading to each annular chamber are formed in the rotor and supply the compressed air to the desired location of the part. The compressed air is supplied preferably when the rotatably seated part is stopped, so that, in this regard, the sealing washers are not subjected to frictional wear. If the rotating part is in operation, however, the sealing washers, although they are loosely maintained between the sides of the grooved roller bearings and respective retaining or guard rings because of the absence of pressure in the annular chambers, rotate along with the bearings or the inner rings of the grooved ball bearings rotate past them, so that wear occurs because of sliding friction, with consequent particle formation. Such particles can cause sealing problems. In addition, the wear of the sealing washers requires additional maintenance work; furthermore, at least one relatively expensive grooved ball bearing is required for each annular chamber and thus for each compressed air connection.

It is therefore an object of the invention to provide a rotary leadthrough of the initially described type which operates free of wear. Furthermore, it should have a compact and inexpensive construction.

With the foregoing and other objects in view, there is provided, in accordance with the invention, a rotary leadthrough for feeding pressurizing medium to a rotatably mounted part, comprising a stator and a rotor rotatable relative thereto, the stator and the rotor being formed with at least one channel, respectively, sealing elements and sealing counter-elements respectively carried by one and the other of the stator and the rotor for cooperatively sealing the stator and the rotor therebetween and for coupling the respective channels formed in the stator and the rotor into at least one medium connection path through which pressurizing medium is feedable, the stator having a longitudinal axis, and the rotor having a rotational axis coinciding with the longitudinal axis of the stator, and means for axially displacing the stator and the rotor relative to one another from a first position thereof wherein the sealing elements are in sealing engagement with the sealing counter-elements, to a second position thereof wherein the sealing elements and the sealing counter-elements are spaced from one another.

Because of the axial mobility in accordance with the invention, it is possible to provide the medium connection path when the part is stopped, so that no wear of the sealing elements and the sealing counter-elements occurs because of this stoppage. During press operation, i.e. while the part is rotating, the sealing elements are spaced from the sealing counter-elements by effecting of an axial return movement, for which reason also press operation is wear-free.

By means of the rotary leadthrough, it is possible in particular to clamp a printing form to the plate cylinder of a printing press, in the course of which the clamping device is opened against a spring force by the application of compressed air, the printing form is secured and the clamping action is performed by turning off the compressed air. However, the invention is not limited to a single operation of this type, but can also be employed for additional functions by means of a suitable number of medium connection paths.

In accordance with another feature of the invention, the stator has a connecting surface, and the rotor has a front face, such as the front face of a shaft journal, the stator and the rotor being relatively displaceable axially by the displacing means so that the connecting surface and the front surface tend to engage and disengage from one another.

The medium connection paths terminate in the front face as well as in the connecting surface, so that when these components are brought together, the connecting path is provided by the sealing elements resting against the sealing counter-elements (first position), and by creating a spacing of the components from one another (by means of an axial displacement movement), an interruption of the connecting paths (second position) becomes possible. Preferably, the stator is disposed so that it is axially displaceable and fixed against relative rotation, and the rotor so that it is axially stationary and rotatable. Displacement of the stator occurs coaxially with the axis of rotation, i.e. centered with respect to the rotatably mounted part.

In accordance with a further feature of the invention, the axially displacing means comprise a medium selected from the group consisting of the pressurizing medium or a different pressurizing medium.

For a particularly simple construction it is provided that, for assuming the first or the second position, the stator is displaceable by means of the same medium which is feedable to the part. To the extent that the concerned medium is compressed air, for example, this compressed air is supplied, on the one hand, to the rotatably seated part via the rotary leadthrough of the invention for performing appropriate functions and, on the other hand, it is used to provide the axial displacement, so that no separate power source is required for this displacement movement. But it is also possible to utilize an outside medium for the displacement movement, i.e. a medium different from the medium to be supplied to the rotatably seated part. However, this entails greater expense.

Preferably the stator is formed by a piston or has a piston, and the piston is guided in an axially displaceable manner in a stationary cylinder. The piston has the connecting surface; it is preferably formed by an end face of the piston.

For establishing a pressure-tight medium connection path, the conduits terminate in the connecting surface or the front face and annular channels are formed or terminate in the front face or the connecting surface. Thus, depending upon the selected embodiment of the aforementioned choices, the connecting surface has either conduits or annular channels. If the connecting surface is equipped with annular channels, the corresponding front face has conduits. If the front face has conduits, the connecting surface has annular channels. The annular channels are edged or encircled or surrounded by annular seals. To this extent, the annular seals constitute the aforementioned sealing elements, while the sealing counter-elements are provided by the areas of the surface against which the annular seals rest during contact between the rotor and stator.

As mentioned hereinbefore, the invention is not limited to a single medium connection path, but instead it is clearly possible to provide a plurality of connection paths simultaneously. Preferably, one medium connection is located in the rotational axis of the part or rotor, so that there is a medium connection, coaxial to the axis of rotation of the part, in which a conduit is formed in the front face as well as in the connecting surface. At least one of the conduit ends located in the front face or the connecting surface is surrounded by an annular seal.

In accordance with the aforedescribed feature of the invention, the annular seals constitute axial seals.

The annular channels are preferably located coaxially with respect to one another and also coaxially with the axis of rotation.

It can be provided in particular that annular grooves connected with the conduits or the annular channels of the connecting surface terminate in the outer cylindrical surface of the piston and communicate, in the first position of the stator, with supply lines for the medium which terminate in the inner cylindrical surface of the cylinder. However, an alternative construction is also possible wherein supply lines connected with the conduits or the annular channels of the connecting surface terminate in the outer cylindrical surface of the piston and communicate, in the first position of the stator, with annular grooves terminating in the inner cylindrical surface of the cylinder, and the medium can be supplied via the annular grooves. By means of the aforementioned constructional variations, the medium can be supplied via the cylinder and via the piston to the connecting location between the stator and the rotor. It is, of course, also possible for annular grooves of the cylinder to be located opposite annular grooves of the piston in order to provide connections which are independent of a rotational position.

To seal the individual medium connection paths against each other, sealing rings are preferably disposed on both sides of the annular grooves.

The piston can be moved from the second position into the first position by means of the medium. To be able to return the piston to its initial position, a restoring spring is preferably provided which acts upon the piston in a direction towards the second position. Alternatively, it is, of course, also possible for the piston to be brought into the second position by means of the medium and for it to be biased or pushed into the first position by the restoring spring. In this case, for example, the medium can be a suction medium, such as suction air (negative pressure), or a pressure medium such as compressed air (positive pressure).

In accordance with a further feature of the invention, the annular seals and/or the sealing rings are extruded on or vulcanized to the piston. Depending upon the construction, it is also possible that the sealing elements which are extruded on or attached by vulcanization are located on the front face of the rotor or the inner cylindrical surface of the cylinder.

In accordance with an added feature of the invention, a bearing for the rotatable part is disposed on the cylinder. To that extent, the cylinder assumes a dual function by, on the one hand, guiding the cylinder axially displaceably and, on the other, supporting the bearing for the rotating part.

A particularly simple construction results when the medium is supplied to the stator via flexible lines. A consequence thereof is that providing a supply of pressurized medium via the walls of the cylinder, such as is provided in connection with the previously described construction, may be omitted, thereby simplifying the structure. In the construction wherein the connecting paths extend through the cylinder wall, it is of course also possible to use flexible lines. However, it is also possible to employ fixedly disposed lines. But if the line supplying the medium follows the axial movement of the stator, it is necessary to employ the flexible lines. The stator has connectors for the flexible lines, and the connectors are coupled so that they communicate with the annular channels or the conduits of the connecting surface. Preferably provided in connection with this feature is that a longitudinal portion of the piston extends out of the cylinder and that the flexible lines lead to the outer cylindrical surface of the portion of the piston extending out of the cylinder. The connectors for the flexible lines are located on this portion of the outer cylindrical surface. The connectors are coupled so as to communicate via appropriate connections, preferably disposed in the interior of the piston, with the conduits or annular channels of the connecting surface.

In accordance with an additional feature of the invention, the stator is formed with a receiving channel for the rotor or a section of the rotor and is axially displaceable with respect to the rotor to assume the first or the second position. For this purpose, it is possible to mount the stator displaceably on the rotor or for the stator to have a bearing supported on the frame of the printing press so that, in this way, the stator encloses only a section of the rotor.

In order to form the medium connection paths, in accordance with yet another feature of the invention, the rotor and/or the wall of the stator defining the receiving channel are formed with surfaces, preferably sealing faces and, in particular, frustoconical surfaces, extending with respect to the displacement direction (axial direction) so as to form annular grooves, the surfaces, in the first position, abutting against sealing ring elements disposed in the wall of the stator defining the receiving channel and/or in the rotor and, in the second position, spaced from the sealing ring elements. The expression "and/or" employed hereinbefore indicates that, depending upon the construction, it is possible either to provide the sealing ring elements in the wall of the stator defining the receiving channel, and the conical surfaces on the rotor, or the conical surfaces on the wall of the stator defining the receiving channel, and the sealing ring elements on the rotor. Depending upon the number of medium connection paths to be formed, a corresponding number of annular grooves with associated sealing ring elements must be provided. In an exemplary embodiment with a plurality of medium connection paths, the annular grooves preferably are located at an axially spaced distance from one another. It is, in particular, possible to provide axially spaced distances of the same length. However, assurance must always be provided that the sealing function will occur synchronously, i.e. sealing of all of the medium connecting paths must occur, in the first position, to be able to operate the device in a simple manner. However, it is also conceivable that there might be several "first positions", which are located at axially spaced distances, and that at least one medium connection path is formed in each one of those "first positions".

Annular spaces are formed between the stator and the rotor due to the frustoconical surfaces. The frustoconical surfaces can preferably be formed during manufacture by means of annular undercuts. In the first position, these annular spaces are sealed in the axial direction on respectively both ends toward the outside or in respect to an adjacent annular space by means of sealing ring elements. Transfer of the medium can then occur via the appropriate annular space.

In accordance with the invention, a circular end face of greater diameter defined by each frustoconical surface is adjoined by a step which slopes towards a circular end face of lesser diameter defined by the respective adjoining frustoconical surface. Depending upon the number of possible medium connection paths, it is necessary to provide a corresponding number of steps plus one extra step.

Conduits of the rotor terminate in the annular grooves for supplying the medium to or into the interior of the rotatably mounted part.

Supply lines which, in the first position, communicate with the respective annular grooves, terminate in the receiving channel of the stator for supplying the medium from the outside.

Several variations are possible with regard to the mounting of the various components. In accordance with one construction, a bearing for the rotatable part is disposed on the stator. Thus, the stator takes over the function of mounting the rotatable part, in addition to offering its own axial mobility. However, alternatively, it is also possible to mount the stator displaceably on the rotor and for the rotor to have fixed bearings on the side of the printing-press frame. Finally, as a further variation, it is conceivable that the stator be mounted on a stationary printing-press frame and, in that case, also provide the support for the rotatable part, as described hereinbefore, or that the rotatable part be separately mounted on the stationary printing-press frame.

In a construction according to the invention described hereinbefore, the sealing ring elements engage the frustoconical surfaces for effecting the sealing function. However, in another construction in accordance with the invention, each frustoconical surface changes over or effects a transition, at the circular end face thereof having a greater diameter, into a cylindrical section of the rotor, and the respective sealing ring element sealingly engages the respective cylindrical section, in the first position of the stator and the rotor. This results in a radial seal.

Other features which are considered as characteristic for the invention are set forth in the appended claims.

Although the invention is illustrated and described herein as embodied in a rotary leadthrough or transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
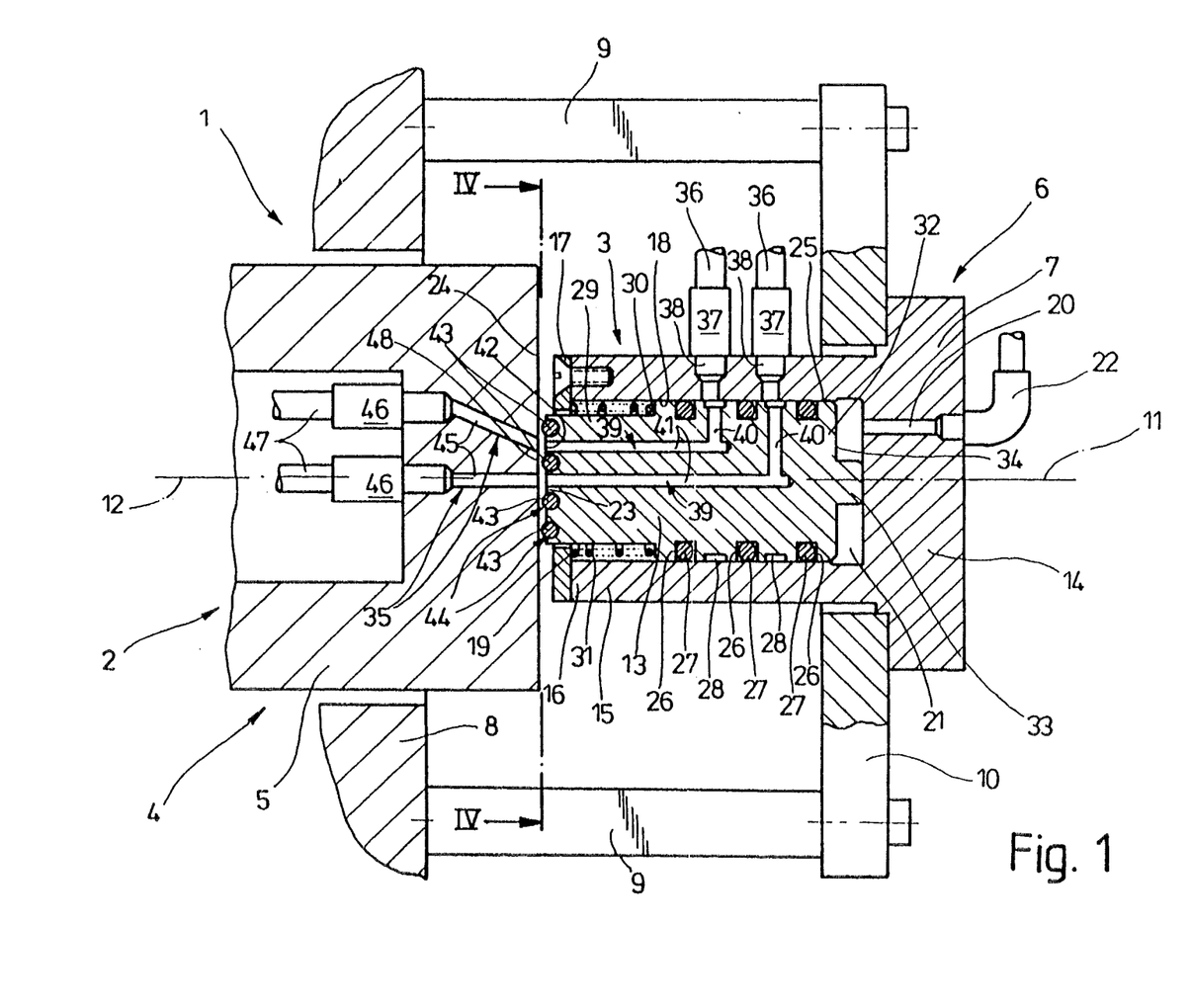
FIG. 1 is a longitudinal sectional view of a first embodiment of a rotary leadthrough or transmission constructed in accordance with the invention.

Referring now to the drawings and, first, particularly to FIG. 1 thereof, there is shown therein a rotary leadthrough 1 for supplying a suction or pressure medium, in particular compressed air, to a rotatably mounted part 2. The rotary leadthrough 1 has a stator 3 and a rotor 4. The rotor 4 is formed by a journal 5 of a plate cylinder of a printing press. In this regard, the rotatable part 2 is the aforementioned plate cylinder. The stator 3 has a piston/cylinder unit 6. A cylinder 7 of the piston/cylinder unit 6 is fastened to a stationary frame 8 of the printing press by spacer bolts 9 and support beams 10 in such a way that a central axis 11 of the cylinder 7 is co-extensive with an axis of rotation 12 of the rotatably seated part 2, and therefore the cylinder 7 is coaxial with the journal 5.

The cylinder 7, the piston 13 and also the journal 5 have circular cross sections with respect to the central axis 11 of the cylinder 7 and the rotational axis 12 of the journal 5.

The cylinder 7 has a housing base plate 14 from which a cylinder wall 15 extends integrally and perpendicularly thereto. An annular plate 17 having an inner diameter smaller than the inner diameter of the interior cylindrical surface 18 of the cylinder 7, thereby forming an annular step 19, is bolted to a head 16 of the cylinder wall 15. A bore 20 extends through the housing base plate 14 parallel to and spaced from the central axis 11 of the cylinder 7. One end of the bore 20 communicates with an interior chamber 21 of the cylinder 7, and the other end of the bore 20 terminates in a connector or union 22, which can be charged with a control medium, for example compressed air. This compressed air may come from the same source as the compressed air which can be supplied to the rotatably mounted part 2 via the rotary leadthrough 1.

In a retracted position of the piston 13, a connecting surface 23 thereof extends beyond the annular plate 17 opposite and a slight distance away from a front face 24 of the journal 5. The connecting surface 23 and the front face 24, respectively, are flat and are disposed parallel to one another. Both surfaces 23 and 24 extend perpendicularly to the axis of rotation 12.

The piston 13 has an outer cylindrical surface 25 formed with a plurality of mutually spaced-apart annular depressions 26 in which sealing rings 27 are received for effecting a sealing with the inner surface 18 of the cylinder 7. Respective annular grooves 28 are formed between the sealing rings 27 of respective pairs thereof in the outer cylindrical surface 25 of the piston 13. Starting from the connecting surface 23, the piston 13 has a section 29 with an outer cylindrical surface of reduced diameter which merges via an annular step 30 with the outer cylindrical surface 25 which cooperates with the inner surface 18 of the cylinder 7. A restoring spring 31, embodied as a helical compression spring, is located in an annular chamber defined by the section 29. One end of the restoring spring 31 is braced against the annular step 19, and the other end of the restoring spring 31 against the annular step 30. The piston 13 is prestressed in a direction towards the housing base plate 14 by this restoring spring 31. The piston 13 has a rear end 32 formed with a central spacing pin or lug 33 which projects beyond a front face 34 of the piston and, in the retracted position of the piston 13, rests against the housing base plate 14.

To form medium connection paths 35 for the supply of compressed air to the rotatably mounted part 2, lines 36 which can be charged with compressed air are provided in accordance with the desired function, and are connected by connectors or unions 37 with conduits or channels 38 which extend through the cylinder wall 15, respectively, in the region between the sealing rings 27. These conduits 38 communicate with the annular grooves 28 formed in the piston 13. Each annular groove 28 is connected to a feed line 39 leading to the connecting surface 23. Each feed line 39 is formed of a radial bore 40 extending from the corresponding annular groove 28 and intersecting an axial bore 41 extending from the connecting surface 23. Annular conduits 42 are disposed in the connecting surface 23 of the piston 13, into which the axial bores 41 discharge, or the sealing elements 43 form these annular conduits 42. The annular conduits 42 are encircled on both sides thereof with sealing elements embodied as annular seals 44. These annular seals 44 form axial seals. In contrast therewith, the aforementioned sealing rings 27 form radial seals. Conduits or channels 45 terminating in the front face 24 lead to connectors or unions 46 to which lines 47 are connected. The lines 47, in turn, lead to functional units of the rotatably mounted part 2, which are activatable by compressed air, such as a printing-form clamping device. The respective openings of the conduits 45 located in the front face 24 can cooperate with a respectively associated annular conduit formed by the one of the sealing elements 43 of the connecting surface 23 of the piston 13. No annular conduit 42 on the connecting surface 23 is required for the medium connection path 35 extending along the central axis 11 of the cylinder and the axis of rotation 12, respectively, along which the axial bore 41 and the conduit 45 extend centrally; instead, the axial bore 41 terminates as a conduit or channel opening in the connecting surface 23 which can cooperate with the corresponding opening of the conduit or channel 45.

The rotary leadthrough 1 of the invention operates as follows:

The printing-form cylinder rotates during the printing process, so that the rotor 4 rotates about the axis of rotation 12. The piston 13 assumes the retracted position thereof shown in FIG. 1, i.e. the spacing journal 33 thereof is biased or forced against the housing base plate 14 by the restoring spring 31. If a new printing form is to be clamped onto the impression cylinder, for example, the printing press is stopped, and the part 2 is then at a standstill. The rotor 4 is, therefore, also at rest, so that there is no rotary movement with respect to the stator 3. The piston 13 is then brought from the retracted to an advanced or extended position thereof by supplying compressed air through the connector 22 and the bore 20, the connecting surface 23 being moved, in the course thereof, in a direction towards the front face 24. The piston 13 is consequently moved in axial direction until the sealing elements 43 come to rest against sealing counter-elements 48 on the front face 24. The sealing counter-elements 48 are those regions of the front face 24 engaged by the annular seals 44. Because of the axially-symmetrical construction of the annular conduits or channels 42, one or more medium connection paths 35 are always formed in the advanced or extended position of the piston 13 independently of the angular position of the rotary part 2. It is readily apparent from FIG. 1 that, in the retracted position of the piston 13, there is an axial offset between the radial bores 40 and the conduits 38. This axial offset is eliminated in the advanced position of the piston 13, i.e. the radial bores 40 are then aligned with the conduits 38. Compressed air can then be introduced by means of a suitable control device via the lines 36 in a desired form and can be fed via a path through the connectors 37, the conduits 38, the radial bores 40, the axial bores 41, the annular conduits 42, the conduits 45, the connectors 46 and the lines 47 to the respective devices, for example the clamping device of the plate cylinder. Only two medium connection paths 35 are shown in the exemplary embodiment of FIG. 1. However, it is also possible to provide only one or more than two medium connection paths 35. When the operational function effected by feeding the compressed air to the rotating part 2 is terminated, the interior chamber 21 of the cylinder 7 is decompressed by opening the feed line 20,22, and the restoring spring 31 pushes the piston 13 back into the retracted position thereof. In this regard, the sealing elements 43 assume a position axially spaced from the sealing counter-elements 48. Thus, no wear of the annular seals 44 can occur during subsequent operation, i.e. rotation of the part 2. Hereinafter, the advanced position of the piston 13 will be referred to as the first position, and the retracted position of the piston 13 as the second position.

It should be noted that the same source can provide the pressure medium for the axial movement of the piston 13 and also for feeding or supplying the medium connection paths 35, because the area of the front face 34 of the piston 13 is greater than the sum of the areas of the individual annular conduits or channels 42, so that, even if all of the medium connection paths 35 are charged with compressed air, assurance is afforded that the piston 13 will not be pushed back in the direction towards the retracted or second position. In this respect, no leaks can therefore occur.

Figure 2:
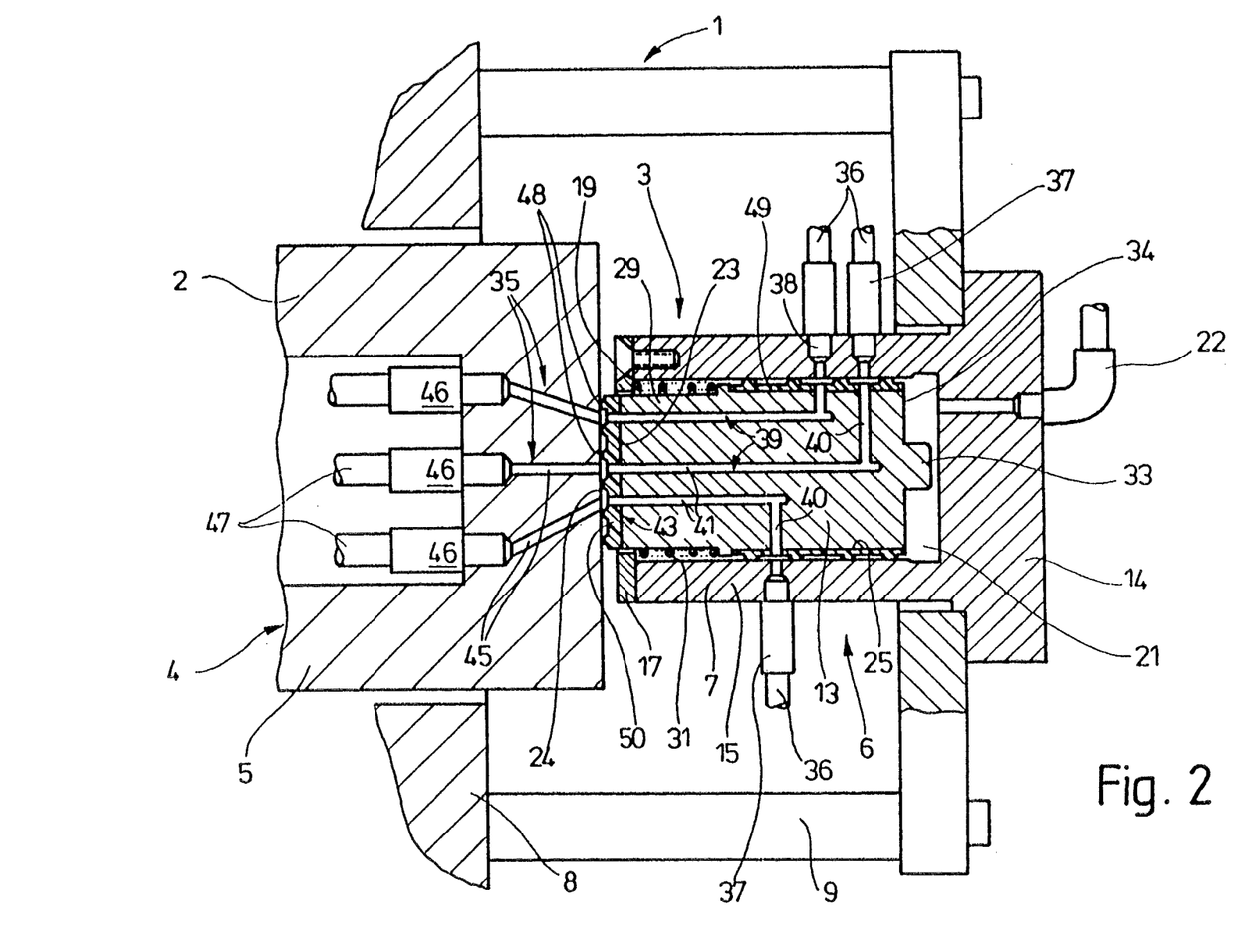
FIG. 2 is a view like that of FIG. 1 of a second embodiment of the rotary leadthrough.

FIG. 2 shows another exemplary embodiment of the rotary leadthrough 1 which, in principle, corresponds to the exemplary embodiment of FIG. 1. The only difference therebetween is that, in place of two medium connection paths 35 of FIG. 1, three medium connection paths 35 are provided in FIG. 2, and that the seal rings 27 and the annular seals 44 are not inserted into respective depressions of the piston 13, but instead have been attached by vulcanization to the surface region 25 or the connecting surface 23 of the piston 13 as corresponding, preferably one-piece, sealing elements 49 and 50, respectively. In the exemplary embodiment of FIG. 2, the piston 13 is shown in the first position, i.e. the advanced position, thereof.

Hereinafter, only the differences between the exemplary embodiment being currently described and the exemplary embodiment of FIG. 1 will be addressed; it can be assumed that the remaining construction of the respective additional embodiment corresponds to that of FIGS. 1 or 2.

Figure 3:
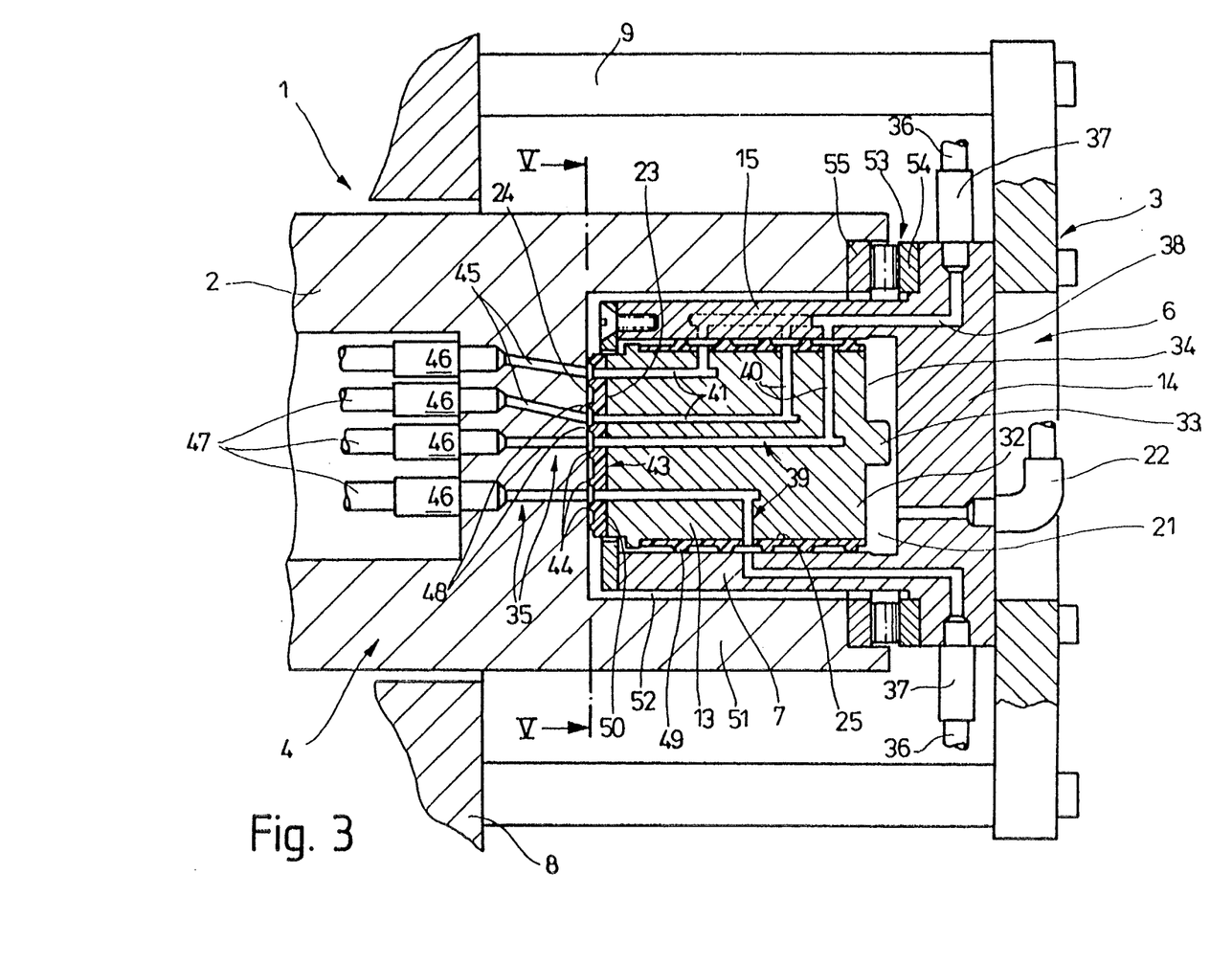
FIG. 3 is a view like those of FIGS. 1 and 2 of a third embodiment of the rotary leadthrough according to the invention.

FIG. 3 shows a further exemplary embodiment of the rotary leadthrough 1. Continuous sealing elements 49 and 50, respectively, have also been applied by vulcanization or the like to the connecting surface 23 of the piston 13 and the inner surface 18 of the piston 13, respectively, in the embodiment of FIG. 3. Each sealing element 49 or 50 is formed continuously and in one piece, radial ridges and axial ridges, respectively, being formed adjacent and spaced from one another, and assuming the function of the sealing rings 27 and the sealing elements 43, respectively, described hereinbefore with respect to FIG. 1.

Four medium connection paths 35 are formed in the exemplary embodiment of FIG. 3. In particular, the rotor 4 thereof has an annular wall 51 extending in the axial direction, so that an interior chamber 52 of cylindrical shape is formed. The greater part of the stator 3 is received in this interior chamber 52. Only the housing base plate 14 is located outside of the interior chamber 52. An axial bearing 53 is located at the step-like transition between the housing base plate 14 and the cylinder wall 15, and includes a bearing ring 54 fastened to the housing base plate 14 and another bearing ring 55 fastened in a recess formed at an end or front of the annular wall 51. In this regard, the rotor 4 and the rotatably seated part 2 therewith are mounted on the stator 3, namely on the cylinder 7. In contrast with the herein aforedescribed exemplary embodiments, in the embodiment of FIG. 3, for reasons of space limitations, the conduits or channels 38 also extend into the housing base plate 14, because of which a very short structural shape can be realized.

No restoring spring 31 is provided in the exemplary embodiment of FIG. 3. By eliminating the restoring spring 31, space remains for a further medium connection 35. Retraction of the piston 13 can be effected by creating a vacuum in the interior chamber 21 of the cylinder. Alternatively or additionally, it is possible to produce the retraction by making the interior chamber 21 of the cylinder pressureless, and then to pressurize it again by supplying air via at least one medium connection path 35, due to which the piston 13 is brought into the retracted position in accordance with the recoil principle, as it were.

Figure 4:
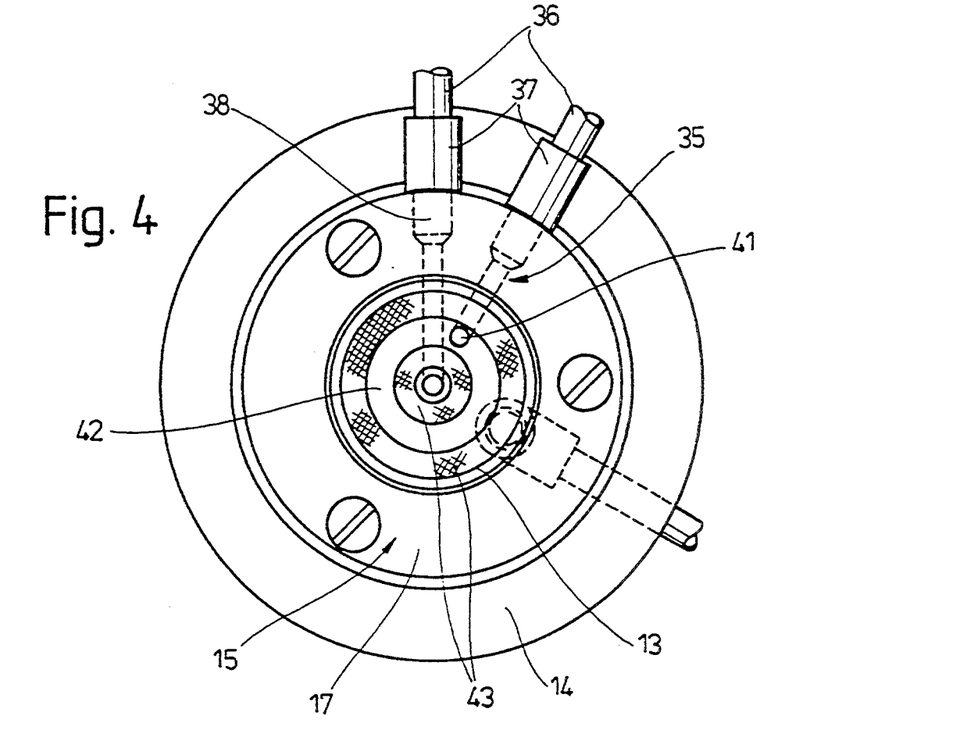
FIG. 4 is a fragmentary cross-sectional view of FIG. 1 taken along the line IV—IV in the direction of the arrows and providing an end view of a stator forming part of the embodiment of FIG. 1.
Figure 5:
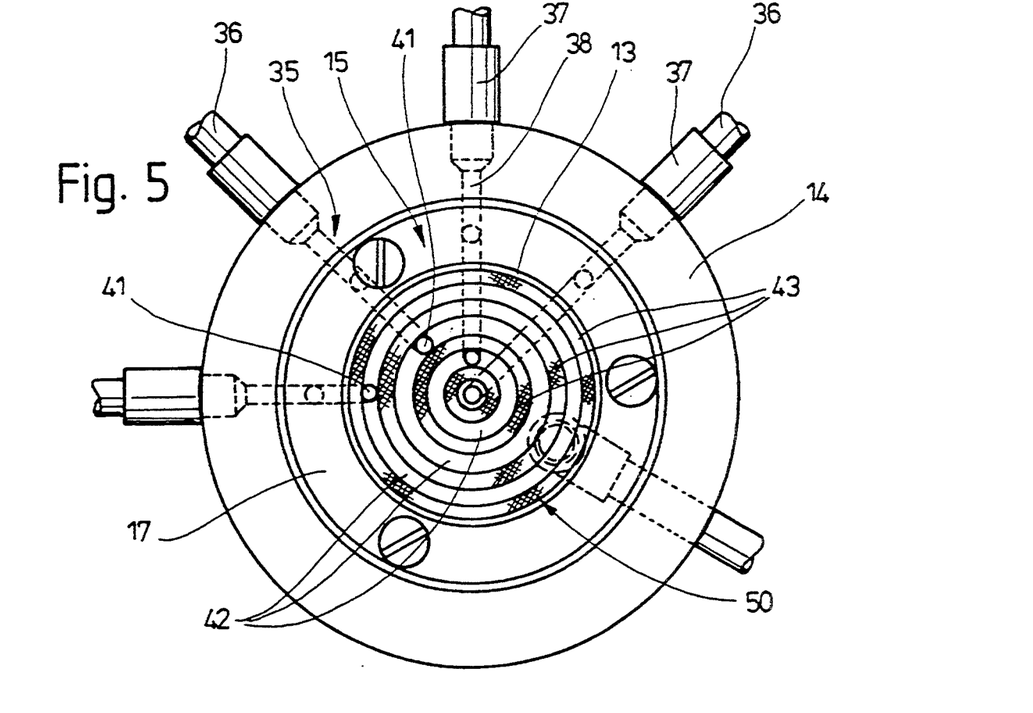
FIG. 5 is a fragmentary cross-sectional view of FIG. 3 taken along the line V—V in the direction of the arrows and providing an end view of a stator forming part of the embodiment of FIG. 3.

FIGS. 4 and 5 are plan views of the connection surfaces 23 of the piston 13. FIG. 4 is such a view of the exemplary embodiment of FIG. 1, and FIG. 5 a corresponding view of the exemplary embodiment of FIG. 3. It can be clearly seen therein that the connectors 37 are disposed along the periphery of the stator 3, angularly offset from one another.

In the embodiments according to FIGS. 1, 2, 7, 8, 9 and 10, respectively described hereinbefore or hereinafter, the connectors 37 can also be arranged in a row extending in the axial direction.

Figure 6:
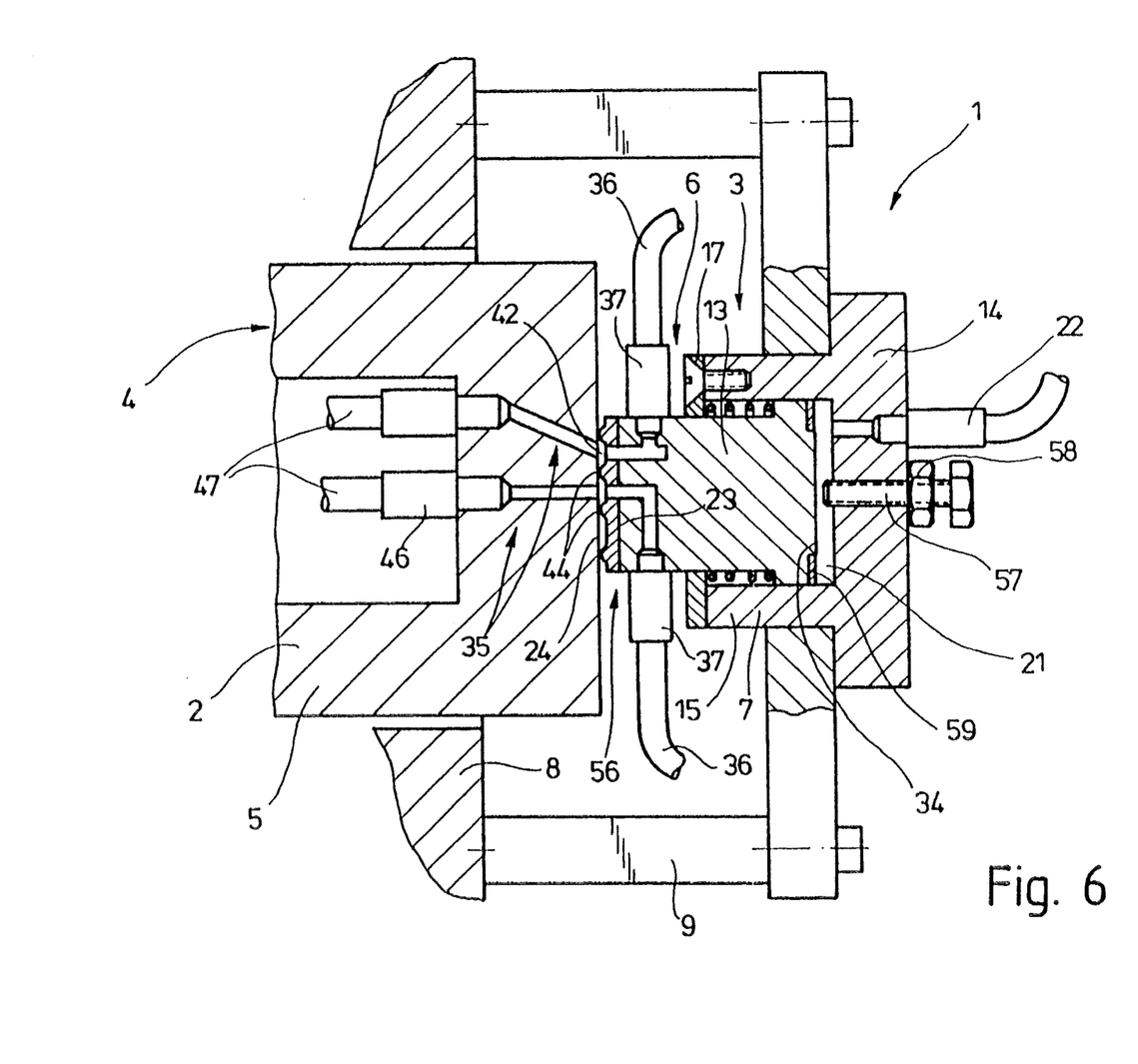
FIG. 6 is a view like those of FIGS. 1, 2 and 3 of a fourth embodiment of the rotary leadthrough.

FIG. 6 illustrates an additional exemplary embodiment of the rotary leadthrough 1, which is constructed particularly simply in comparison with the previously described exemplary embodiments. Hereinafter, again, only the differences therein in comparison with the herein aforedescribed exemplary embodiments will be addressed. The medium connection paths do not extend through the wall of the cylinder 7, as previously described, but rather, they are brought directly to the piston 13 via flexible lines 36. For this purpose, a partial length 56 of the piston 13 projects out of the cylinder 7 both in the first as well as in the second position. The flexible lines 36 are led to connectors 37 on the periphery of this projecting part 56. The connectors 37 are in contact with radial bores 40 or axial bores 41 of the piston. The axial bores 41 lead to corresponding annular conduits or channels 42, as mentioned hereinbefore in connection with the aforedescribed exemplary embodiments.

In contrast with the aforedescribed exemplary embodiments, the piston 13 of the exemplary embodiment of FIG. 6 does not have a spacing journal 33. Instead, an adjustable stop 57 is provided, which is embodied as a set screw extending through the housing base plate 14. The set screw has a threaded shaft by which it is screwed into a corresponding threaded bore formed in the housing base plate 14 and is secured by means of a counter or lock nut 58. An annular seal 59 is provided in the region of the front face 34 of the piston 13 for sealing the interior chamber 21 of the cylinder 7.

Figure 7:
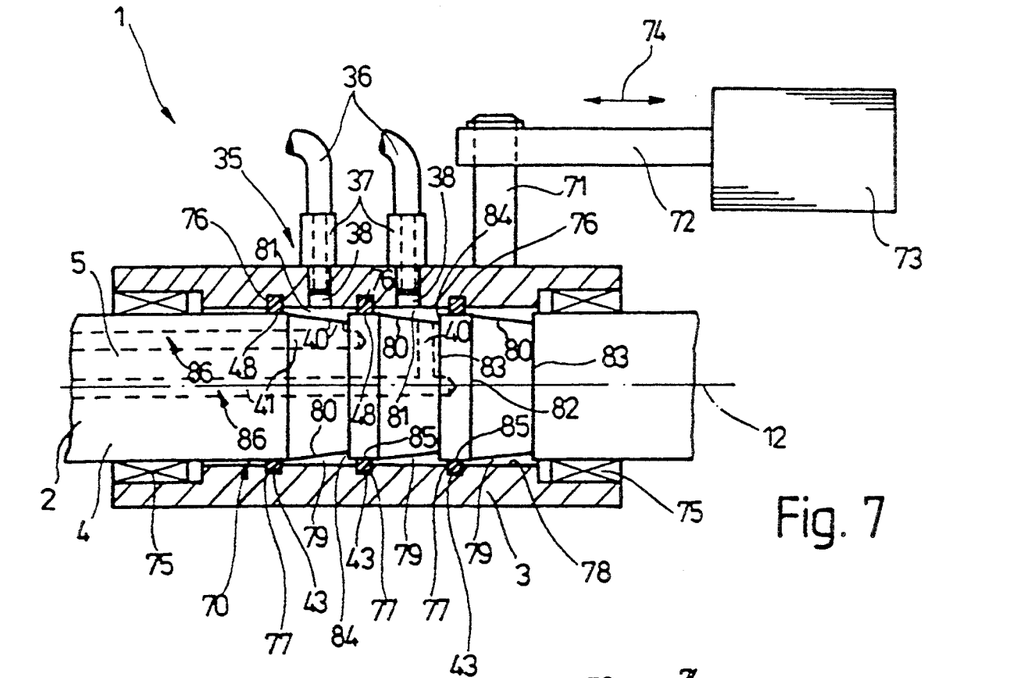
FIGS. 7 and 8 are longitudinal sectional views of a fifth embodiment of the rotary leadthrough, shown in different phases of operation thereof.

FIG. 7 shows a further exemplary embodiment of a rotary leadthrough 1 for a rotatably mounted part 2. This part 2 represents the rotor 4 which is radially enclosed by a stator 3. In this regard, the stator 3 has a receiving channel 70 extending coaxially with the axis of rotation 12 of the rotor 4. In accordance with FIG. 7, the stator 3 is embodied as a hollow cylinder, the interior of which constitutes the receiving channel 70. As in the aforedescribed exemplary embodiments, the rotor 4 of FIG. 7 preferably represents a journal 5, in particular, a shaft journal of the rotatably mounted part 2 which can be embodied as the plate cylinder of a printing press, for example.

The stator 3 is mounted so as to be displaceable in the direction of the axis of rotation 12, i.e., axially with respect to the rotor 4. Its radial position is fixed, i.e., it is secure against relative rotation with the rotor 4. The stator 3 has a radial extension 71, which is engaged by an actuating rod 72 of an adjusting device 73 for effecting the axial displacement of the stator 3 in either direction of the double-headed arrow 74 from a first position into a second position, and from the second position to the first position. As is readily apparent, the actuating rod 72 extends parallel to the axis of rotation 12. The adjusting device 73 can be embodied as a manual device or a pneumatic device. It is also possible to generate the movement of the actuating rod 72 and, consequently, the axial displacement of the stator 3 with respect to the rotor 4 hydraulically or electro-mechanically.

The stator 3 has two radial bearings 75 therewithin, which are spaced axially from one another and rotatably support the rotor 4.

Flexible lines 36 leading to connectors or unions 37, which are disposed on the outer cylindrical surface of the stator 3, are provided for forming medium connection paths 35 for supplying a suction and/or pressure medium, for example compressed air, to the rotatably mounted part 2. Conduits or channels 38 radially lead from the connectors 37 into the receiving channel 70 of the stator 3. The number of medium connection paths 35 is determined by the number of the required control functions on the rotatably mounted part 2. A corresponding number of conduits 38 are provided on the stator 3 at an axially spaced distance from one another. Each opening of the conduits 38 terminating in the receiving channel 70 is flanked on either side by sealing elements 43, these sealing elements 43 being embodied as sealing rings 76 extending coaxially with the central axis of the receiving channel 70, which coincides with the axis of rotation 12. The sealing rings 76 are seated in annular depressions 77 formed on the inner cylindrical surface 78 of the receiving channel 70. The sealing rings 76 extend radially inwardly beyond the inner cylindrical surface 78 so that they can cooperate sealingly with the rotor 4.

The rotor 4 is formed with annular grooves 79 axially spaced from one another. A respective one of the annular grooves 79, is assigned to each conduit 38. Preferably, the annular grooves 79 will have been formed during manufacture by providing annular undercuts in the rotor 4. The annular grooves 79, respectively, are defined by conical surfaces 80 which are inclined at an angle, respectively, to the axial displacement direction of the stator 3 and to the axis of rotation 12 of the rotatably seated part 2. These conical surfaces 80 also radially define or limit the annular chambers 81 formed between the rotor 4 and the stator 3 by of the annular grooves 79. Because the conical surfaces 80 are inclined to the axis of rotation 12, each conical frustum defined thereby has a circular side 82 of relatively greater diameter and a circular side 83 of relatively smaller diameter. Each side 82 of greater diameter of each conical surface 80 extends via a step 84 to the smaller-diameter side 83 of a respective adjacent conical surface 80. It is apparent from FIG. 7 that a cylindrical section 85 adjoins each circular side 82 of greater diameter in the axial direction and extends further in the axial direction and via the step 84 to the circular side 83 of smaller diameter of the next adjoining conical surface 80.

Conduits or channels 86, respectively, made up of a radial bore 40 and an axial bore 41, terminate in each annular chamber 81. The axial bores 41 lead to the aforementioned actuation devices, which are not shown in FIG. 7 and which can be operated via the medium connection paths 35 by applied compressed air when the rotatably seated part 2 is stopped.

Figure 8:
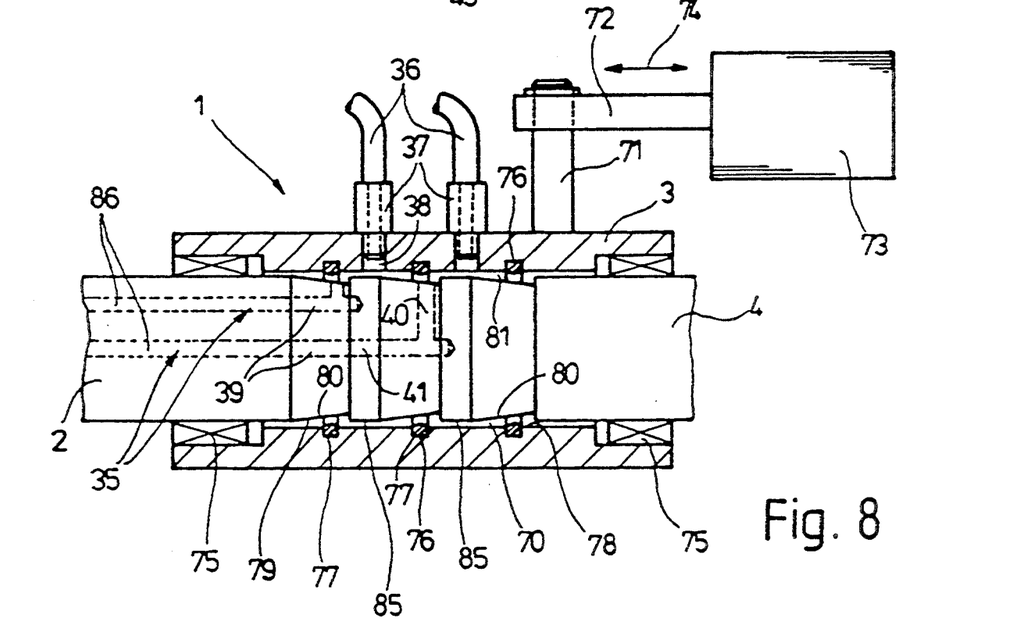

The rotary leadthrough 1 of FIG. 7 is shown in a different operating phase thereof in FIG. 8. The operation thereof is accordingly described hereinafter with respect to both of those figures: Starting from the phase of operation of the leadthrough 1 illustrated in FIG. 8, the stator 3 is shown in the second position previously attained by means of the adjusting device 73. This second position is assumed when the rotatably seated part 2 is rotating; for example when the printing press performs a printing operation. In this second position of FIG. 8, the sealing elements 43 or sealing rings 76 are located spaced-away from the walls, i.e., the respective outer frustoconical surfaces, on the rotor side of the annular chambers 81. Therefore, no wear of the sealing rings 76 occurs. If the rotatable part 2 is then stopped in an arbitrary angular position in order to execute operational functions via the aforementioned medium connection paths 35, the stator 3 is displaced axially by means of the adjusting device 73 in the direction of the axis of rotation 12 with respect to the rotor 4 in a manner that the rotary leadthrough 1 assumes the first position thereof shown in FIG. 7. In the course thereof, the sealing rings 76 move towards the frustoconical surfaces 80 in the vicinity of the circular sides or ends 82 of greater diameter and, in the course of continued axial movement, as far as the cylindrical sections 85, which form sealing counter-elements 48 for the sealing rings 76. It is then possible, with every medium connection path 35, to supply compressed air to the rotatably seated part 2 via the line 36, the connector or union 35, the conduit or channel 38, the annular chamber 81, the radial bore 40 and the axial bore 41, respectively. When this operation is over, the stator 3 is axially displaced back into the second position illustrated in FIG. 8, wherein the sealing rings 76 are released or disengaged from the respective surfaces of the rotor 4.

Figure 9:
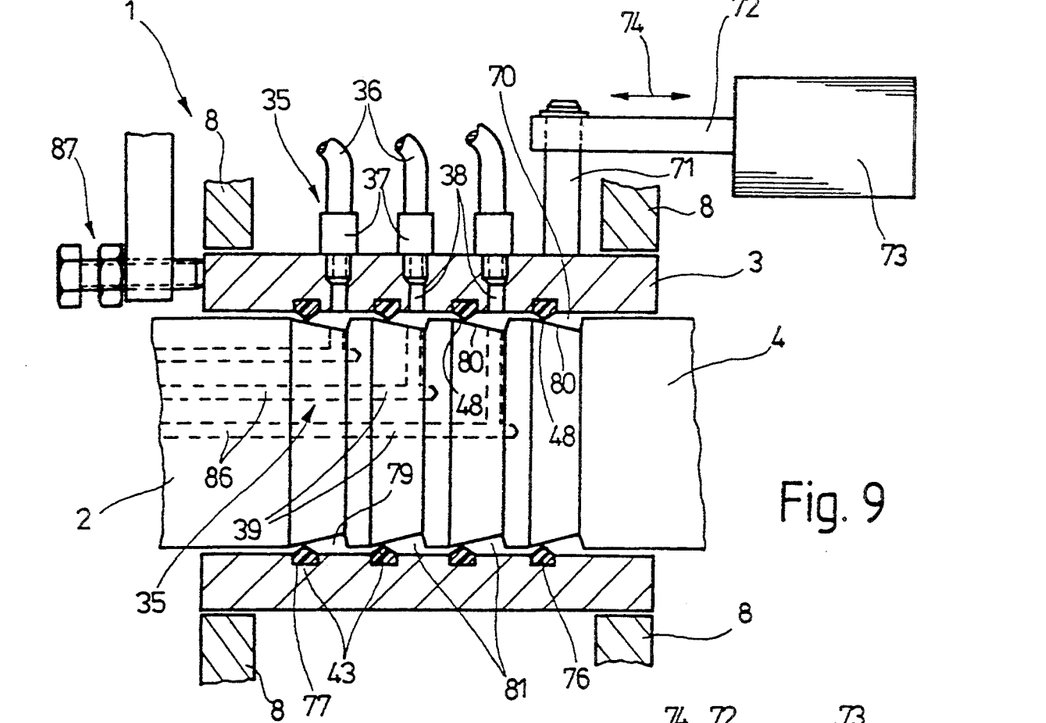
FIGS. 9 and 10 are longitudinal sectional views of a sixth embodiment of the rotary leadthrough, shown in different operating phases thereof.

In FIG. 9, yet another exemplary embodiment of a rotary leadthrough 1 is shown, which operates in accordance with the very same principle as does the rotary leadthrough 1 of the exemplary embodiment of FIG. 7. In this regard, only the differences therebetween will be addressed hereinafter. Instead of two medium connection paths 35, as in the embodiment of FIG. 7, three medium connection paths 35 are provided in the exemplary embodiment of FIG. 9. A further difference is that the stator 3 is not supported axially displaceably on the rotor 4, as in FIG. 7, for example, but is instead supported on the frame 8 of the printing press, as shown in FIG. 8. The manner in which the part 2 is supported, namely also on the printing-press frame, is not illustrated in FIG. 9. In the first position, the axial movement of the stator 3 is limited by an adjustable stop 87. In accordance with FIG. 9, which shows the stator 3 in the first position, the sealing elements 43 for sealing the annular chambers 81 do not move as far as the cylindrical sections 85 of the rotor 4, as in the exemplary embodiment of FIG. 7, but rather, to respective positions of rest on the frustoconical surfaces 80. Prestressing for sealing can be adjusted by calibrating the adjustable stop 87.

Figure 10:
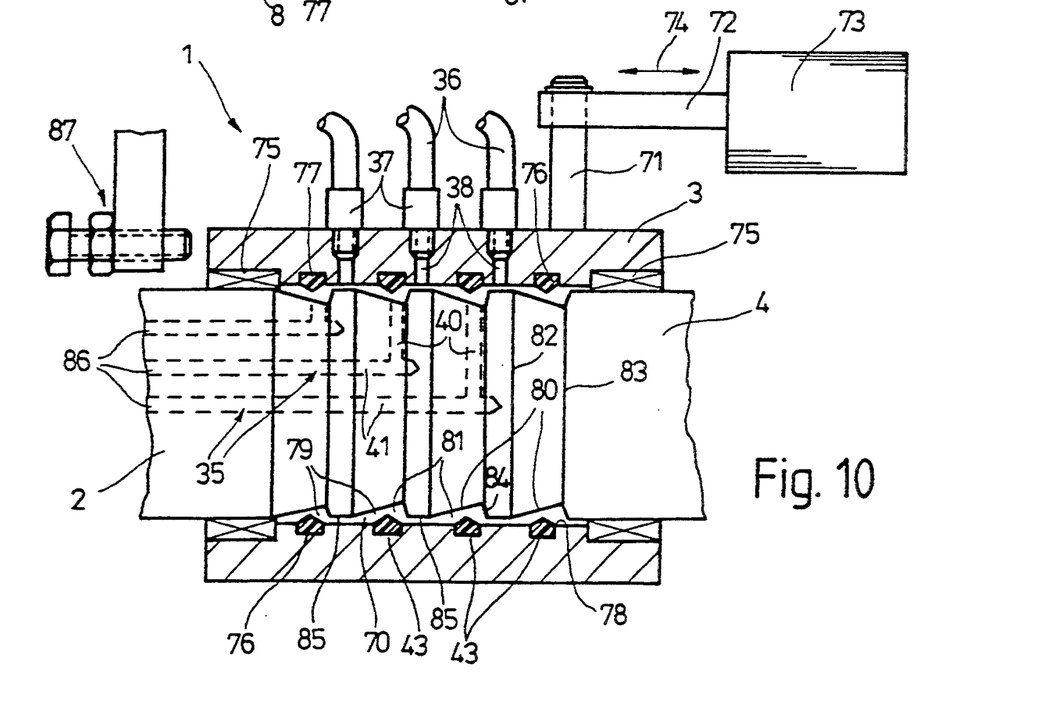

Whereas FIG. 9 shows the rotary leadthrough 1 in the first position thereof wherein the sealing elements 43 rest on the frustoconical surfaces 80 in the vicinity of the circular sides 82 of greater diameter, so that the corresponding regions of the conical surfaces 80 form the sealing counter-elements 48, FIG. 10 illustrates the second position of the rotary leadthrough 1 wherein the sealing elements 43 are spaced from the sealing counter-elements 48. Furthermore, the stator 3, as shown in FIG. 10, is supported in the same manner as has been previously described with respect thereto in the exemplary embodiment of FIG. 7.

Figure 11:
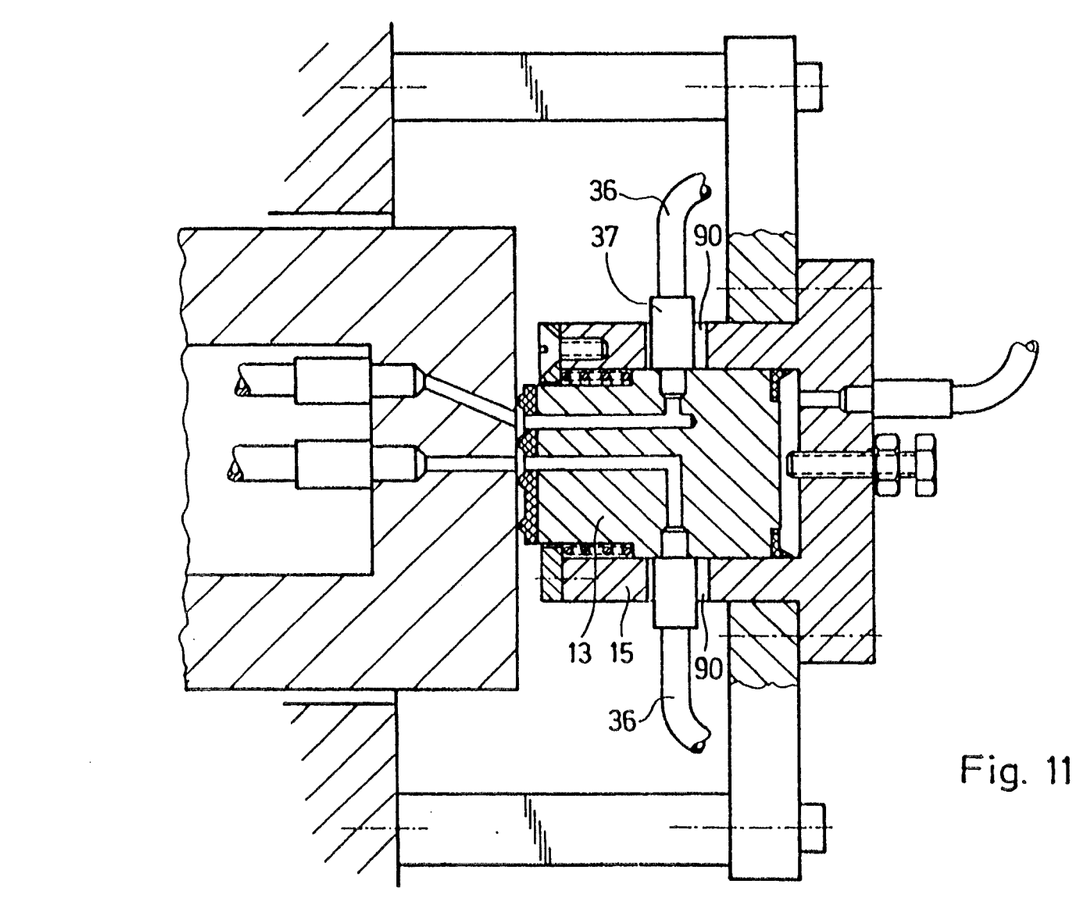
FIG. 11 is a view like that of FIG. 6, for example, of a seventh embodiment of the rotary leadthrough according to the invention.

FIG. 11 shows yet a further embodiment of the invention. It differs from the embodiment shown in FIG. 6 in that, the medium connection paths, although directly applied to the piston 13 by flexible lines 36, extend through cutouts 90 formed in the cylinder wall 15.

The cutouts 90 formed in the cylinder wall 15 must be sufficiently large so that the lines 36 are not jolted during adjusting movements of the piston 13. This embodiment also offers the advantage that no sealing elements for the medium connection paths are required between the piston 13 and the cylinder wall 15.

I claim:

1. A rotary leadthrough for a printing machine for feeding one of suction or pressurizing medium to a rotor of the printing machine, comprising a stator in which the rotor is rotatable, sealing means disposed between the rotor and stator for providing sealing therebetween regardless of the angular position between the rotor and the stator, said stator adapted to form a cylinder having an axis colinear with said rotor, said rotor forming a journal in said stator, a piston slidably supported in said cylinder between a first position proximal to the rotor and a second position away from the rotor, said sealing means including at least one sealing element contacting said journal in the first position of said piston, wherein in its second position said sealing element is spaced away from said journal, in which second position said piston is stationary relative to said rotor, and piston moving means in operative engagement with said piston for moving it between its first and second position; wherein said piston has a cylindrical surface, a plurality of axially disposed bores in said piston, an equal plurality of circular peripheral channels formed in said cylindrical surface, each peripheral channel fluidly communicating with a respective bore, said cylinder having an inner cylinder surface, a plurality of access channels equal to said plurality of peripheral channels formed in said inner cylinder surface, wherein said access channels are fluidly communicating with a respective peripheral channel when said piston is in its first position.

2. A rotary leadthrough according to claim 1, including a plurality equal to said plurality of bores of radially extending channels, each radial channel having opposite ends respectively communicating with a respective bore and a respective peripheral channel for providing fluid communication between each respective access channel and a respective bore.

3. A rotary leadthrough according to claim 1 including a reset spring in operative engagement with said piston for urging said piston toward its second position.

4. A rotary leadthrough according to claim 1, wherein said sealing means include a plurality of sealing rings disposed on said piston.

5. A rotary leadthrough according to claim 4, wherein said sealing rings are attached to said piston by at least one of the means: vulcanizing or spraying.

6. A rotary leadthrough for a printing machine for feeding one of suction or pressurizing medium to a rotor of the printing machine, comprising a stator in which the rotor is rotatable, sealing means disposed between the rotor and stator for providing sealing therebetween regardless of the angular position between the rotor and the stator, said stator adapted to form a cylinder having an axis colinear with said rotor, said rotor forming a journal in said stator, a piston slidably supported in said cylinder between a first position proximal to the rotor and a second position away from the rotor, said sealing means including at least one sealing element contacting said journal in the first position of said piston, wherein in its second position said sealing element is spaced away from said journal, in which second position said piston is stationary relative to said rotor, and piston moving means in operative engagement with said piston for moving it between its first and second position; wherein said cylinder includes an end surface of said cylinder spaced away from said rotor, and wherein said piston moving means include a further bore through said end surface for applying further pressure medium to said cylinder for moving said piston from its second to its first position.

* * * * *